(12) United States Patent
Deroover

(10) Patent No.: US 8,313,576 B2
(45) Date of Patent: Nov. 20, 2012

US008313576B2

(54) PREPARING AND DISPERSING SURFACE-MODIFIED COLOUR PIGMENTS

(75) Inventor: Geert Deroover, Lier (BE)

(73) Assignee: AGFA-GEVAERT N.V., Mortsel (BE)

( * ) Notice: Subject to any disclaimer, the term of this patent is extended or adjusted under 35 U.S.C. 154(b) by 0 days.

(21) Appl. No.: 13/501,260

(22) PCT Filed: Oct. 15, 2010

(86) PCT No.: PCT/EP2010/065529
§ 371 (c)(1),
(2), (4) Date: Apr. 11, 2012

(87) PCT Pub. No.: WO2011/054654
PCT Pub. Date: May 12, 2011

(65) Prior Publication Data
US 2012/0202927 A1    Aug. 9, 2012

Related U.S. Application Data

(60) Provisional application No. 61/259,669, filed on Nov. 10, 2009.

(30) Foreign Application Priority Data

Nov. 3, 2009 (EP) .................... 09174929

(51) Int. Cl.
*C09B 67/00* (2006.01)
*C09B 67/10* (2006.01)
*C09B 67/20* (2006.01)

(52) U.S. Cl. ........ 106/493; 106/494; 106/495; 106/496; 106/497; 106/498; 106/31.6; 106/31.75; 106/31.76; 106/31.8

(58) Field of Classification Search ............ 106/493, 106/494, 495, 496, 497, 498, 31.6, 31.75, 106/31.76, 31.8
See application file for complete search history.

(56) References Cited

U.S. PATENT DOCUMENTS

| 6,083,315 A * | 7/2000 | Nakamura et al. ............ 106/410 |
| 2003/0134938 A1 | 7/2003 | Nakamura et al. |
| 2008/0312358 A1 * | 12/2008 | Deroover et al. ............ 523/333 |
| 2009/0038505 A1 * | 2/2009 | Deroover .................... 106/31.8 |

FOREIGN PATENT DOCUMENTS

| DE | 102 42 875 A1 | 5/2003 |
| EP | 0 430 875 A2 | 6/1991 |
| EP | 0 504 922 A1 | 9/1992 |
| EP | 0 851 005 A2 | 7/1998 |
| EP | 0 894 835 A2 | 2/1999 |
| EP | 1 790 696 A1 | 5/2007 |
| JP | 2001-81354 A | 3/2001 |
| WO | 2005/044937 A1 | 5/2005 |
| WO | 2007/060254 A2 | 5/2007 |
| WO | 2008/034472 A1 | 3/2008 |

OTHER PUBLICATIONS

Official Communication issued in International Patent Application No. PCT/EP2010/065529, mailed on Jan. 20, 2011.

* cited by examiner

*Primary Examiner* — Anthony J Green
(74) *Attorney, Agent, or Firm* — Keating & Bennett, LLP

(57) ABSTRACT

A method of preparing a pigment includes the steps of: a) providing a mixture including:
a pigment selected from the group of pigments including at least 50 wt % of C.I. Pigment Violet 23, C.I. Pigment Red 146, C.I. Pigment Red 176, C.I. Pigment Red 177, C.I. Pigment Violet 19 and C.I. Pigment Orange 13 based on the total weight of the pigment;
alkyl nitrile; and
at least one acid selected from the group consisting of sulfuric acid and chlorosulfuric acid, with the acid present in the mixture in amount of more than 2 wt % based on the total weight of the pigment;
b) heating the mixture for more than 2 hours to a temperature of at least 70° C.; and
c) filtering the mixture and washing the filtrand with a washing liquid containing water until the filtrate has a pH between 4 and 7. Pigments obtainable by the method and non aqueous pigment dispersions are also disclosed.

13 Claims, No Drawings

PREPARING AND DISPERSING SURFACE-MODIFIED COLOUR PIGMENTS

CROSS-REFERENCE TO RELATED APPLICATIONS

This application is a 371 National Stage Application of PCT/EP2010/065529, filed Oct. 15, 2010. This application claims the benefit of U.S. Provisional Application No. 61/259,669, filed Nov. 10, 2009, which is incorporated by reference herein in its entirety. In addition, this application claims the benefit of European Application No. 09174929.1, filed Nov. 3, 2009, which is also incorporated by reference herein in its entirety.

BACKGROUND OF THE INVENTION

1. Field of the Invention

The present invention relates to surface-modified colour pigments and methods for preparing them. The present invention also relates to non-aqueous pigment dispersions using these pigments 2. Description of the Related Art Polymeric dispersants are substances for promoting the formation and stabilization of a dispersion of pigment particles in a dispersion medium. They typically contain in one part of the molecule so-called anchor groups, which adsorb onto the pigments to be dispersed. In a spatially separate part of the molecule, polymeric dispersants have polymer chains compatible with the dispersion medium, thus stabilizing the pigment particles in the dispersion medium.

In aqueous pigment dispersions, the polymeric dispersants generally contain hydrophobic anchor groups exhibiting a high affinity for the pigment surface and hydrophilic polymer chains for stabilizing the pigments in the aqueous dispersion medium.

Thermally stable non-aqueous dispersions with submicron particles are much more difficult to prepare, especially for pigments having a non-polar surface. Particularly high requirements are set when manufacturing solvent based, oil based and radiation curable inkjet inks. Inadequate dispersing manifests itself as increased viscosity in liquid systems, loss of brilliance and/or hue shifts. Moreover, particularly good dispersion of the pigment particles is required to ensure unimpeded passage of pigment particles through the nozzles of a print head. In addition, pigment particle agglomeration and the associated blockage of the printer nozzles have to be avoided in the standby periods of the printer.

One approach to disperse pigments with a hydrophobic surface in a non-aqueous dispersion medium is by modifying the pigment surface to a hydrophilic surface by addition of so-called dispersion synergists. WO 2007/060254 (AGFA GRAPHICS) discloses quinacridone derivatives having carboxylic acid groups for modifying the surface of quinacridone pigments.

EP 430875 (CIBA GEIGY) discloses water-based coating materials containing a quinacridone pigment which is mixed with its sulphonated derivative (see example 11-13).

EP 504922 (HOECHST) discloses dioxazine pigments in acrylic resin lacquers wherein the surface of the pigment is modified by coating with sulphonic acid group-containing dioxazine derivatives.

EP 851005 (SEIKO EPSON) discloses in example 2 the preparation of a pigment including a quinacridone to which a sulfonic acid group is attached.

EP 894835 (TOYO INK) discloses an inkjet recording liquid comprising an organic pigment in particulate form, wherein the interior of each pigment particle particle is substantially free of sulfonic acid groups and the surface of each pigment particles carries a sulfonic acid group.

JP 2001-081354 (KONICA) discloses inkjet inks containing a coloring material comprising a compound containing a dye residue with a nitrogen atom bonded to a sulfonic acid or sulfonate group.

In another approach, the pigment surface is modified by direct chemical reaction. WO 2008/034472 (AGFA GRAPHICS) discloses a surface modification of several yellow pigments by hydrolyzing their methyl ester groups though the addition of sulfuric acid.

EP 1678264 A (FUJIFILM) discloses non-aqueous, radiation-curable inkjet inks comprising pigment, dispersant and a liquid carrier, wherein the pigment has an acid value greater than 8 mg of NaOH per gram of pigment. It is not disclosed how such pigments should be prepared.

US 2003134938 (DAINICHISEIKA) discloses a process producing a sulfonated solid particle by burning sulfur to yield gaseous sulfur dioxide, subjecting the gaseous sulfur dioxide to catalytic oxidation to yield gaseous sulfur trioxide, and sulfonating a dry powdery or granular solid particle with the gaseous sulfur trioxide in a gas phase-solid phase reaction. Sulfur dioxide and sulfur trioxide are highly toxic compounds which can also cause chemical burn on the skin of operators. Their use is to be avoided from a safety and also an environmental perspective. Furthermore, sulfonation using gaseous sulfur trioxide tends to be inhomogeneous, whereby not all particles are sufficiently sulfonated or pigment surfaces are only very locally sulfonated, resulting in poor dispersion quality and stability. Even when using a fluid bed process to avoid the generation of preferential flow through channels for the gaseous sulfur trioxide, the dispersion quality and stability could not be maximized. In addition, very small amounts of water vapour present during sulfonation lead to the formation of sulfuric acid, which must be neutralized and/or washed away to avoid dispersion problems.

Although several approaches exist for enhancing dispersion quality and stability of non-aqueous pigment dispersions, it remains difficult to obtain this for a number of pigments, such as e.g. C.I. Pigment Violet 23, a pigment of large interest for automotive lacquers.

Therefore, it is highly desirable to obtain via a simple synthesis, having minimal health and environmental impacts, modified pigments which can be dispersed in non-aqueous media to exhibit high dispersion quality and stability.

SUMMARY OF THE INVENTION

In order to overcome the problems described above, it has been surprisingly found that non-aqueous pigment dispersions, especially non-aqueous inkjet inks, of high dispersion quality and stability were obtained with pigment surface modification by (chloro)sulfuric acid in an alkyl nitrile containing medium, while such stable dispersions could not be obtained by sulfonated dispersion synergists, by sulfonation with gaseous $SO_3$ or by sulfonation in water or other organic solvents.

Preferred embodiments of the present invention provide a pigment and a method of preparing the pigment, by a simple synthesis, having minimal health and environmental impacts and exhibiting excellent dispersion quality and stability in non-aqueous pigment dispersions, as defined below.

Advantages and benefits obtained by the preferred embodiments of the present invention are high image quality with non-aqueous pigment dispersions, especially with non-aqueous inkjet inks.

Other features, elements, steps, characteristics and advantages of the present invention will become more apparent from the following detailed description of preferred embodiments of the present invention hereinafter.

DETAILED DESCRIPTION OF PREFERRED EMBODIMENTS

Definitions

The term "mixed crystal", which is synonymous for "solid solution", as used in disclosing the present invention, means a solid, homogeneous mixture of two or more constituents, which may vary in composition between certain limits and remain homogeneous. Mixed crystals are also referred to as solid solutions. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Methods of Preparation

The method of preparing a pigment according to a preferred embodiment of the present invention comprises the steps of:

a) providing a mixture including:

a pigment selected from the group of pigments comprising at least 50 wt % of C.I. Pigment Violet 23, C.I. Pigment Red 146, C.I. Pigment Red 176, C.I. Pigment Red 177, C.I. Pigment Violet 19 and C.I. Pigment Orange 13 based on the total weight of the pigment;

an alkyl nitrile; and at least one acid selected from the group consisting of sulfuric acid and chlorosulfuric acid, with the acid present in the mixture in amount of more than 2 wt % based on the total weight of the pigment;

b) heating the mixture for more than 2 hours to a temperature of at least 70° C.; and c) filtering the mixture and washing the filtrand with a washing liquid to remove residual acid.

The alkyl nitrile was found to be an essential component of the mixture in step a). The replacement by water or another organic solvent did not deliver non-aqueous pigment dispersions of good dispersion quality and stability. It is believed that the wetting properties of the pigment surface by alkyl nitrile and its relative inertness to sulfonation play a crucial role in the sulfonation process.

In a preferred embodiment of the preparation method, the alkyl nitrile is selected from the group consisting of acetonitrile, propionitrile and butyronitrile. More preferably the alkyl nitrile is acetonitrile, because this allows refluxing at lower temperatures.

The mixture including alkyl nitrile, (chloro)sulfuric acid and the pigment can be mixed in any desirable way, for example, simply by stirring or by using ultrasonic energy. Suitable mixing apparatuses are well-known to the skilled person and include a planetary mixer, a dissolver and a Dalton Universal Mixer.

It was also found that sulfuric acid or chlorosulfuric acid could not be replaced by other liquid sulfonating reactants, such as e.g. methanesulfonic acid. Sulfuric acid and/or chlorosulfuric acid is present in the mixture in amount of more than 5 wt %, preferably between 10 and 50 wt %, more preferably between 20 and 40 wt %, wherein all wt % are based on the total weight of the pigment.

The mixture should be heated for at least 2 hours to a temperature of at least 70° C. In a preferred embodiment of the preparation method, the mixture is heated at a temperature at least 75° C. and more preferably at least 80° C. The mixture is preferably heated for at least 4 hours, more preferably at least 6 hours and most preferably at least 8 hours.

After the heating in step b), the mixture is preferably cooled before filtration in step c). The mixture is cooled preferably to a temperature below 45° C., more preferably below 35° C. and most preferably below 25° C. before filtration in step c). Cooling can be performed simply by removing the heating means and letting the mixture cool down, or alternatively active cooling may be performed, e.g. using ice.

Filtration is a technique used either to remove impurities from an organic solution or to isolate an organic solid. The two types of filtration commonly used are gravity filtration and vacuum or suction filtration.

In the method of preparing a pigment according to a preferred embodiment of the present invention, filtration is used to separate a solid, called the filtrand or residue, from a liquid, called the filtrate or supernatant fluid, whereby the filtrand is retained and the filtrate is discarded.

In the method of preparing a pigment according to a preferred embodiment of the present invention, the filtrand is preferably washed with a washing liquid containing water until the filtrate has a pH between 4 and 7. The washing liquid removes any residual amount of the (chloro)sulfuric acid which is detrimental for preparing non-aqueous pigment dispersions exhibiting good dispersion quality and stability. The pH of the filtrate is indicative for the presence of the acid. At a pH between 4 and 7, the detrimental effect of (chloro)sulfuric acid remaining in the filtrand on the dispersion quality and stability of non-aqueous pigment dispersions was observed to be small.

The washing liquid may consist of water, but preferably a mixture of water and an alkyl nitrile is used since this increases the washing efficiency. In a preferred embodiment of the preparation method, the washing liquid consists of water and acetonitrile.

Alternatively the washing liquid may consist of an alkyl nitrile, preferably the washing liquid may consist of acetonitrile, since it was observed that lower viscosity of the pigment dispersion was then obtained.

In a preferred embodiment of the preparation method, the method comprises a further step d) of drying the filtrand. The filtrand is preferably dried to remove all the water, since for preparing non-aqueous pigment dispersions water is an undesired contaminant. The filtrand or surface modified pigment can be dried in any desirable way. These drying methods are well-known to the skilled person. Preferred drying methods include an oven at 60° C. using hot air ventilation, a microwave drier, reduced pressure drier and the like.

Pigments

The pigment is obtainable by the method according to a preferred embodiment of the present invention from a pigment or mixed crystal selected from the group of pigments comprising at least 50 wt %, preferably at least 70 wt % and more preferably at least 90 wt % C.I. Pigment Violet 23, C.I. Pigment Red 146, C.I. Pigment Red 176, C.I. Pigment Red 177, C.I. Pigment Violet 19 and C.I. Pigment Orange 13 based on the total weight of the pigment.

In a preferred embodiment, the pigment is obtainable by the method according to the present invention from a pigment selected from the group consisting of C.I. Pigment Violet 23, C.I. Pigment Red 146, C.I. Pigment Red 176, C.I. Pigment Red 177, C.I. Pigment Violet 19 and C.I. Pigment Orange 13 based on the total weight of the pigment.

The pigments C.I. Pigment Violet 23, C.I. Pigment Red 146, C.I. Pigment Red 176, C.I. Pigment Red 177, C.I. Pigment Violet 19 and C.I. Pigment Orange 13 or mixed crystals thereof for preparing the pigment according to a preferred embodiment of the present invention are readily available from commercial sources such as CLARIANT, DAIN-ICHISEIKA, CIBA and BASF.

A preferred C.I. Pigment Violet 23 pigment is PV Fast Violet BLP which is available from CLARIANT.

Non-Aqueous Pigment Dispersions

The non-aqueous pigment dispersion according to a preferred embodiment of the present invention includes a non-aqueous dispersion medium, a polymeric dispersant and at least one pigment according to a preferred embodiment of the present invention. The non-aqueous pigment dispersion can be advantageously used in paints, lacquers and printing inks for applications in inkjet, offset, flexography and the like In a preferred embodiment, the non-aqueous pigment dispersion is curable by UV radiation or e-beam.

In one preferred embodiment, the non-aqueous pigment dispersion is an inkjet ink, more preferably an inkjet ink curable by UV radiation or e-beam.

In another preferred embodiment, the non-aqueous pigment dispersion is a paint or a lacquer, preferably an automotive lacquer.

The non-aqueous pigmented dispersion according to a preferred embodiment of the present invention may further also contain at least one surfactant to control the homogenous spreading of the pigment dispersion on a substrate. For a non-aqueous pigmented inkjet ink, the surfactant is important to control the dot size of the ink droplet on a substrate.

In a preferred embodiment the non-aqueous pigmented dispersion is a non-aqueous inkjet ink containing at least one humectant to prevent the clogging of the nozzle, due to its ability to slow down the evaporation rate of ink.

The viscosity of an inkjet ink is preferably lower than 30 mPa·s, more preferably lower than 15 mPa·s, and most preferably between 2 and 10 mPa·s at a shear rate of $100 \text{ s}^{-1}$ and a jetting temperature between 10 and 70° C.

The non-aqueous inkjet ink forms preferably part of a non-aqueous CMYK inkjet ink set. The non-aqueous CMYK inkjet ink set may also be extended with extra inks such as red, green, blue, violet and/or orange to further enlarge the colour gamut of the image. The CMYK ink set may also be extended by the combination of full density and light density inks of both colour inks and/or black inks to improve the image quality by lowered graininess.

The pigments are preferably present in the range of 0.05 to 20%, more preferably in the range of 0.1 to 10% by weight and most preferably in the range of 1 to 6% by weight, each based on the total weight of the pigment dispersion or inkjet ink.

Non-Aqueous Dispersion Media

The dispersion medium used in the pigment dispersion according to a preferred embodiment of the present invention is a non-aqueous liquid. The dispersion medium may consist of organic solvent(s).

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable examples of organic solvents are disclosed in [0053] to [0146] of EP 1857510 A (AGFA GRAPHICS).

If the pigment dispersion is a curable pigment dispersion or inkjet ink, organic solvent(s) are preferably fully replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the pigmented inkjet ink and most preferably the curable pigment dispersion doesn't include any organic solvent.

For oil based pigment dispersions and inkjet inks the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cyclopar-affins (cyclooctane and higher cyclo-alkanes) and mixtures of paraffin oils.

Suitable examples of oils are disclosed in [0151] to [0164] of EP 1857510 A (AGFA GRAPHICS).

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310,115 (AGFA), incorporated herein by reference. Particularly preferred compounds are 2-(2-vinyloxyethoxy)ethyl (meth) acrylate, most preferably the compound is 2-(2-vinyloxy-ethoxy)ethyl acrylate.

Polymeric Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH. Particularly preferred dispersants are SOLSPERSE™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Photoinitiators

If the pigment dispersion or ink is radiation curable, preferably one or more photoinitiators are present in the pigment dispersion or ink.

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulfonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the curable pigment dispersion or ink.

In order to increase the photosensitivity further, the curable pigment dispersion or ink may additionally contain co-initiators. Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The Preferred Co-Initiators are Aminobenzoates.

When one or more co-initiators are included into the curable pigment dispersion or ink according to a preferred embodiment of the present invention, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The curable pigment dispersion or ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The curable pigment dispersion may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total pigment dispersion or ink.

Binders

Non-aqueous pigment dispersions based on organic solvents or oils preferably include a binder resin. The binder functions as a viscosity controlling agent and also provides fixability relative to the polymeric resin substrate, e.g. a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in a pigment dispersion or ink is preferably in the range of 0.1 to 30 wt %, more preferably 1 to 20 wt %, most preferably 2 to 10 wt % based on the total weight of the pigment dispersion or ink.

Surfactants

The pigment dispersion or ink may contain at least one surfactant. The surfactant(s) can be anionic, cationic, non-ionic, or zwitter-ionic and are usually added in a total quantity less than 20 wt % based on the total weight of the inkjet ink and particularly in a total less than 10 wt % based on the total weight of the pigment dispersion or ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound as disclosed above may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol.

The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Spectral Separation Factor

The spectral separation factor SSF was found to be an excellent measure to characterize a pigmented inkjet ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with large colour gamut. Often inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these inkjet ink sets is low or mediocre.

EXAMPLES

Materials

All materials used in the following examples were readily available from standard sources such as ALDRICH CHEMICAL Co. (Belgium) and ACROS (Belgium) unless otherwise specified. The water used was deionized water.

PV23 is PV Fast Violet BLP which is a C.I. Pigment Violet 23 pigment available from CLARIANT.

PR176 is Novoperm CARMINE™ HF3C which is a C.I. Pigment Red 176 pigment available from CLARIANT.

PR146 is Permanent CARMINE™ FBB02 which is a C.I. Pigment Red 146 pigment available from CLARIANT.

PR122 is HOSTAPERM™ Rosa E02 which is a C.I. Pigment Red 122 pigment available from CLARIANT.

PV19 is INK JET RED™ E5B02 VP2984 which is a C.I. Pigment Violet 19 pigment available from CLARIANT.

PO34 is DIACETENIL™ Orange T which is a C.I. Pigment Orange 34 pigment available from CAPELLE PIGMENTS NV (Belgium).

PO13 is SUNBRITE™ Orange 13 which is a C.I. Pigment Orange 13 pigment available from SUN CHEMICAL CORPORATION.

PR177 is CROMOPHTAL™ Red A2B which is a C.I. Pigment Red 177 pigment available from CIBA-GEIGY.

PR214 is PV FAST RED™ BNP which is a C.I. Pigment Red 214 pigment available from CLARIANT.

S35000 and 539000 are SOLSPERSE™ 35000 respectively 39000 are polyethyleneimine core grafted with polyester-hyperdispersants from LUBRIZOL.

DEGDEE is diethylene glycol diethyl ether.

DS-1 is a dispersion synergist according to Formula DS-1:

Formula DS-1

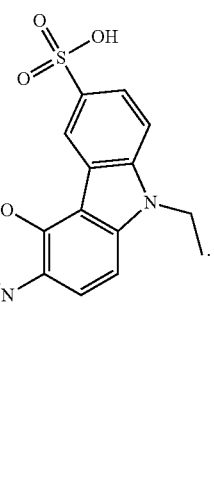

58.8 g (0.1 mol) of PV23 was dissolved and heated to 130° C. in 400 mL concentrate sulphuric acid. After 30 minutes the solution was cooled to room temperature and dropped into 2 L water. The precipitate was filtered off and washed with acetone. The yield of DS-1 was 85%.

DS-2 is a dispersion synergist according to Formula DS-2:

Formula DS-2

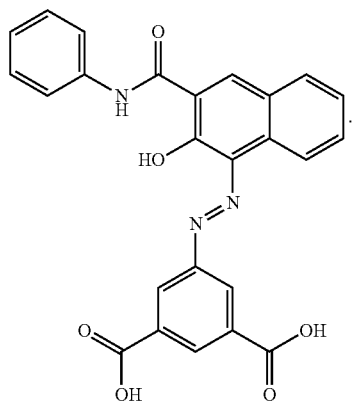

Synthesis of DS-2 is described (Naphthol AS colorant NAC-1) in WO 2007/060261 (AGFA GRAPHICS)).

DS-3 is a dispersion synergist according to Formula DS-3:

Formula DS-3

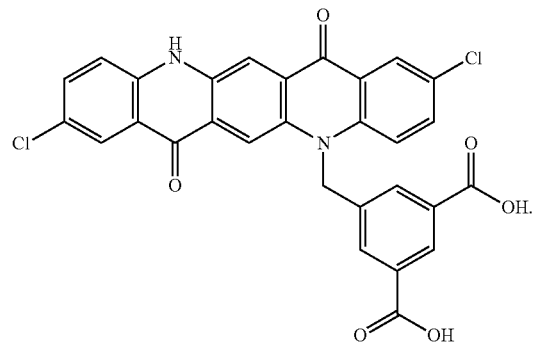

The synthesis of DS-3 is described in EP 1960475 A (AGFA GRAPHICS)

DS-4 is a dispersion synergist SOLSPERSE™ 22000 from LUBRIZOL.

Measurement Methods

1. Measurement of SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

if the colour ink has a maximum absorbance $A_{max}$ between 400 and 500 nm then the absorbance $A_{ref}$ must be determined at a reference wavelength of 600 nm, If the colour ink has a maximum absorbance $A_{max}$ between 500 and 600 nm then the absorbance $A_{ref}$ must be determined at a reference wavelength of 650 nm, If the colour ink has a maximum absorbance $A_{max}$ between 600 and 700 nm then the absorbance $A_{ref}$ must be determined at a reference wavelength of 830 nm. For C.I. Pigment Violet 23 pigments, the absorbance $A_{ref}$ was determined at a reference wavelength of 730 nm.

The absorbance was determined in transmission with a Shimadzu UV-2101 PC double beam-spectrophotometer. The inks were diluted with ethyl acetate to have a pigment concentration of 0.002 wt % based on the total weight of the ink. Quinacridone containing pigments were measured at a dilution of 0.005 wt % based on the total weight of the ink due to their lower extinction.

A spectrophotometric measurement of the UV-VIS-NIR absorption spectrum of the diluted ink was performed in transmission-mode with a double beam-spectrophotometer using the settings of Table 1. Quartz cells with a path length of 10 mm were used and ethyl acetate was chosen as a blank.

TABLE 1

| Mode | Absorbance |
| --- | --- |
| Wavelength range | 240-900 nm |
| Slit width | 2.0 nm |
| Scan interval | 1.0 nm |
| Scan speed | Fast (1165 nm/min) |
| Detector | photo-multiplier(UV-VIS) |

Efficient pigmented inkjet inks exhibiting a narrow absorption spectrum and a high maximum absorbance have a value for SSF of at least 30, more preferably at least 60.

2. Pigment Dispersion Stability

The dispersion stability was evaluated by comparing the SSF before and after a heat treatment of one week at 80° C. Pigmented inkjet inks exhibiting good dispersion stability have a SSF after heat treatment still larger than 30 and a loss in SSF of less than 35%, more preferably less than 10%.

3. Average Particle Size

The particle size of pigment particles in pigmented inkjet ink was determined by photon correlation spectroscopy at a wavelength of 633 nm with a 4 mW HeNe laser on a diluted sample of the pigmented inkjet ink. The particle size analyzer used was a MALVERN™ nano-S available from Goffin-Meyvis.

The sample was prepared by addition of one drop of ink to a cuvette containing 1.5 mL ethyl acetate and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is below 200 nm, preferably between 70 and 150 nm. The pigmented inkjet ink is considered to be a stable pigment dispersion if the particle size remained below 200 nm after a heat treatment of 7 days at 80° C.

Example 1

This example illustrates the simplicity of the method for preparing a pigment according to a preferred embodiment of the present invention.

Preparation of sulfonated pigment SPV-9

The pigment SPV-9 was prepared using the conditions as mentioned in Table 2.

TABLE 2

| Sulfonation solvent | acetonitrile |
|---|---|
| Sulfonating agent | |
| Type | sulfuric acid |
| Amount | 20.0 wt % based on the weight of the pigment |
| Reaction conditions | |
| Temperature | 80° C. |
| Time | 8 hours |
| Washing liquid | water |

A mixture of 50 g of the starting pigment PV23, 380 mL acetonitrile and 10.0 g sulfuric acid is placed in a vessel open only at the top. This vessel is connected to a Liebig condenser and the mixture is refluxed for 8 hours. The mixture is then cooled to 20° C. and filtered. The filtrand was washed with water until a pH of 5 was reached by the filtrate. The filtrand was dried overnight at 40° C. in a vacuum oven. 47 g of a violet powder were recovered.

Example 2

This example illustrates the effect of the reaction conditions on the dispersion quality and stability of the sulfonated pigments in inkjet inks.

Preparation of pigments

The pigments SPV-1 to SPV-8 and SPV-10 to SPV-18 were prepared in exactly the same manner as SPV-9 in Example 1 except that the reaction conditions according to Table 3 were used.

TABLE 3

| Pigment | Sulfonation solvent | Sulfonating agent Type | Sulfonating agent wt % | Washing liquid | Reaction conditions Temp (° C.) | Reaction conditions Time (h) |
|---|---|---|---|---|---|---|
| SPV-1 | acetonitrile | $H_2SO_4$ | 2 | acetonitrile | 80 | 24 |
| SPV-2 | acetonitrile | $H_2SO_4$ | 2 | water + acetonitrile | 80 | 24 |
| SPV-3 | acetonitrile | $H_2SO_4$ | 2 | water + acetonitrile | 80 | 48 |
| SPV-4 | acetonitrile | $H_2SO_4$ | 5 | water | 80 | 8 |
| SPV-5 | acetonitrile | $H_2SO_4$ | 5 | water | 80 | 16 |
| SPV-6 | acetonitrile | $H_2SO_4$ | 5 | acetonitrile | 80 | 24 |
| SPV-7 | acetonitrile | $H_2SO_4$ | 5 | water + acetonitrile | 80 | 24 |
| SPV-8 | acetonitrile | $H_2SO_4$ | 10 | water | 80 | 8 |
| SPV-9 | acetonitrile | $H_2SO_4$ | 20 | water | 80 | 8 |
| SPV-10 | acetonitrile | $H_2SO_4$ | 40 | water | 80 | 2 |
| SPV-11 | acetonitrile | $H_2SO_4$ | 40 | water | 80 | 4 |
| SPV-12 | acetonitrile | $H_2SO_4$ | 40 | water | 80 | 8 |
| SPV-13 | propionitrile | $H_2SO_4$ | 40 | water | 80 | 8 |
| SPV-14 | ethylacetate | $H_2SO_4$ | 40 | water | 79 | 8 |
| SPV-15 | sulfolane | $H_2SO_4$ | 40 | water | 80 | 8 |
| SPV-16 | water | $H_2SO_4$ | 40 | water | 80 | 8 |
| SPV-17 | acetonitrile | $ClSO_3H$ | 8 | water | 80 | 6 |
| SPV-18 | acetonitrile | $CH_3SO_3H$ | 40 | water + acetonitrile | 80 | 8 |

The comparative pigments CPV-1 and CPV-2 were prepared by sulfonating PV23 with gaseous $SO_3$ at 20° C. respectively 60° C. in accordance with US 2003134938 (DAINICHISEIKA).

The pigment CPV-3 was prepared from a part of CPV-2 by washing the pigment CPV-2 with water followed by filtration until the filtrate had a pH of 5, and then drying it.

Preparation and Evaluation of Inkjet Inks

All inkjet inks were prepared in the same manner to obtain a composition A or B as described in Table 4, depending on whether or not a dispersion synergist DS-1 was used.

TABLE 4

| wt % of component | Formulation A | Formulation B |
|---|---|---|
| Pigment | 5.00 | 4.50 |
| Dispersion synergist DS-1 | — | 0.50 |
| SOLSPERSE ™ 39000 | 5.00 | 5.00 |
| DEGDEE | 90.00 | 90.00 |

A pigment dispersion was made by mixing the pigment, the polymeric dispersant, optionally the dispersion synergist, and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

The comparative inkjet inks COMP-1 and COMP-2 were prepared using an untreated pigment PV23. The inkjet ink COMP-2 was the sole ink prepared according to Formulation B using the dispersion synergist DS-1. The comparative inkjet inks COMP-3 to COMP-13 and the inventive inkjet inks INV-1 to INV-12 were prepared using a sulfonated pigment according to Table 5. The average particle size and the spectral separation factor SSF were determined to evaluate the dispersion quality and were determined again after a heat treatment of 1 week at 80° C. The results are also listed in Table 5.

TABLE 5

| Inkjet ink | Pigment | Dispersion quality & stability | | | |
|---|---|---|---|---|---|
| | | After preparation | | After heat treatment | |
| | | SSF | Size (nm) | % Loss in SSF | Size (nm) |
| COMP-1 | PV23 | 6 | 2020 | 0% | 2282 |
| COMP-2 | PV23 | 2 | 1299 | 0% | 1483 |
| COMP-3 | CPV-1 | 10 | 1063 | 20% | 1580 |
| COMP-4 | CPV-2 | 34 | 512 | 21% | 421 |
| COMP-5 | CPV-3 | 24 | 557 | 8% | 448 |
| COMP-7 | SPV-1 | 41 | 280 | 7% | 302 |
| COMP-8 | SPV-2 | 56 | 196 | 32% | 297 |
| COMP-9 | SPV-3 | 107 | 102 | 61% | 305 |
| INV-1 | SPV-4 | 120 | 91 | 64% | 224 |
| INV-2 | SPV-5 | 135 | 72 | 0% | 69 |
| INV-3 | SPV-6 | 130 | 87 | 0% | 86 |
| INV-4 | SPV-7 | 168 | 71 | 0% | 69 |
| INV-5 | SPV-8 | 109 | 68 | 0% | 64 |
| INV-6 | SPV-9 | 91 | 78 | 0% | 73 |
| INV-7 | SPV-10 | 89 | 127 | 36% | 184 |
| INV-8 | SPV-11 | 95 | 98 | 4% | 95 |
| INV-9 | SPV-12 | 65 | 95 | 0% | 88 |
| INV-11 | SPV-13 | 44 | 78 | 0% | 95 |
| COMP-10 | SPV-14 | 6 | 1453 | Flocculated | |
| COMP-11 | SPV-15 | 8 | 1680 | Flocculated | |
| COMP-12 | SPV-16 | 7 | 1480 | Flocculated | |
| INV-12 | SPV-17 | 65 | 81 | 0% | 84 |
| COMP-13 | SPV-18 | 6 | 1600 | 0% | 1350 |

The comparative inkjet inks COMP-2 to COMP-5 improve the dispersion quality and stability somewhat over the comparative inkjet ink COMP-1 through the use of 11 wt % of dispersion synergist DS-1 or by gaseous sulfonation, but still to an inadequate level for inkjet inks.

From the comparative inkjet inks COMP-7 to COMP-9 using only 2 wt % of sulfuric acid during sulfonation it can be derived that although a good dispersion quality can be obtained that even after 48 hours of sulfonation no adequate dispersion stability can be obtained.

The skilled person would readily derive from the results of inventive inkjets INV-1, INV-2, INV-7 and INV-8 the minimum limits for any combination of the amount of sulfonating agent and the reaction time.

The inventive inkjet ink INV-11 shows that the sulfonation solvent acetonitrile can be replaced by another alkyl nitrile to maintain good dispersion quality and stability, but that replacement by water or other organic solvents leads to inkjet inks of poor dispersion quality and stability.

The inventive inkjet ink INV-12 shows that sulfuric acid may be replaced by chlorosulfuric acid as the sulfonating agent to maintain good dispersion quality and stability, while it cannot be replaced by methanesulfonic acid in comparative inkjet ink COMP-13.

Example 3

This example illustrates that the method for preparing a pigment according to a preferred embodiment of the present invention can be used for some other pigments.

Preparation of Pigments

The pigments SPR-1 to SPR-9 and SPO-1 to SPO-6 were prepared in exactly the same manner as SPV-9 in Example 1 except that the starting pigments and the reaction conditions according to Table 6 were used. For pigment, a dispersion synergist was used to "sulfonate" the starting pigment PR176.

TABLE 6

| Pigment | Starting Pigment | Sulfonation solvent | Sulfonating agent | | Reaction conditions | |
|---|---|---|---|---|---|---|
| | | | Type | wt % | Temp (° C.) | Time (h) |
| SPR-1 | PR214 | acetonitrile | $H_2SO_4$ | 40 | 80 | 8 |
| SPR-2 | PR176 | acetonitrile | DS-2 | 11 | 80 | 8 |
| SPR-3 | PR176 | ethylacetate | $H_2SO_4$ | 40 | 79 | 8 |
| SPR-4 | PR176 | water | $H_2SO_4$ | 40 | 80 | 8 |
| SPR-5 | PR176 | acetonitrile | $H_2SO_4$ | 40 | 80 | 8 |
| SPR-6 | PR146 | acetonitrile | $H_2SO_4$ | 40 | 80 | 8 |
| SPR-7 | PR122 | acetonitrile | $H_2SO_4$ | 40 | 80 | 8 |
| SPR-8 | PV19 | acetonitrile | $H_2SO_4$ | 40 | 80 | 8 |
| SP0-1 | PO34 | acetonitrile | $H_2SO_4$ | 40 | 80 | 8 |
| SP0-2 | PO34 | ethylacetate | $H_2SO_4$ | 40 | 80 | 8 |
| SP0-3 | PO34 | water | $H_2SO_4$ | 40 | 80 | 8 |
| SP0-4 | PO13 | ethylacetate | $H_2SO_4$ | 40 | 80 | 8 |
| SP0-5 | PO13 | water | $H_2SO_4$ | 40 | 80 | 8 |
| SP0-6 | PO13 | acetonitrile | $H_2SO_4$ | 40 | 80 | 8 |
| SPR-9 | PR177 | acetonitrile | $H_2SO_4$ | 40 | 80 | 8 |

Preparation and Evaluation of Inkjet Inks

All inkjet inks were prepared in the same manner to obtain a composition A, B or C as described in Table 7, depending on whether or not a dispersion synergist was used.

TABLE 7

| wt % of component | Formulation type | | |
|---|---|---|---|
| | A | B | C |
| Pigment | 5.00 | 4.50 | 4.50 |
| Dispersant | 5.00 | 5.00 | 5.00 |
| Dispersion synergist DS-3 | — | 0.50 | — |
| Dispersion synergist DS-4 | — | — | 0.50 |
| DEGDEE | 90.00 | 90.00 | 90.00 |

A pigment dispersion was made by mixing the pigment, the polymeric dispersant, optionally the dispersion synergist, and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

The comparative inkjet inks COMP-14 to COMP-35 and the inventive inkjet inks INV-13 to INV-18 were prepared according to Table 8. The average particle size and the spectral separation factor SSF were determined to evaluate the dispersion quality and were determined again after a heat treatment of 1 week at 80° C. The results are also listed in Table 8.

TABLE 8

| Inkjet ink | Pigment | Formulation Type | Dispersant | Dispersion quality & stability | | | |
|---|---|---|---|---|---|---|---|
| | | | | After preparation | | After heat treatment | |
| | | | | SSF | Size (nm) | % Loss SSF | Size (nm) |
| COMP-14 | PR214 | A | SP39000 | 4 | 3104 | 0 | 1149 |
| COMP-15 | SPR-1 | A | SP39000 | 5 | 2689 | 0 | 1122 |
| COMP-16 | PR176 | A | SP39000 | 10 | 792 | 0 | 419 |
| COMP-17 | SPR-2 | A | SP39000 | 30 | 294 | 3 | 260 |
| COMP-18 | SPR-3 | A | SP39000 | 12 | 747 | Flocculated | |
| COMP-19 | SPR-4 | A | SP39000 | 11 | 950 | Flocculated | |
| COMP-20 | PR146 | A | SP39000 | 4 | 2000 | 0 | 1800 |
| INV-13 | SPR-5 | A | SP39000 | 49 | 118 | 0 | 113 |
| INV-14 | SPR-6 | A | SP35000 | 114 | 102 | 16 | 102 |
| COMP-21 | PR122 | A | SP35000 | 26 | 384 | 42 | 782 |
| COMP-22 | PR122 | B | SP35000 | 75 | 125 | 65 | 94 |
| COMP-23 | SPR-7 | A | SP35000 | 31 | 300 | 29 | 503 |
| COMP-24 | PV19 | A | SP39000 | 151 | 88 | 87 | 332 |
| INV-15 | SPR-8 | A | SP39000 | 36 | 130 | 0 | 130 |
| COMP-25 | PO34 | A | SP35000 | 5 | 1230 | 0 | 852 |
| COMP-26 | PO34 | C | SP35000 | 42 | 309 | 45 | 307 |
| COMP-27 | SPO-1 | A | SP35000 | 11 | 711 | 0 | 727 |
| COMP-28 | PO34 | A | SP39000 | 5 | 1424 | Flocculated | |
| COMP-29 | SPO-2 | A | SP39000 | 5 | 1200 | Flocculated | |
| COMP-30 | SPO-3 | A | SP39000 | 6 | 839 | Flocculated | |
| COMP-31 | PO13 | A | SP39000 | 4 | 1556 | 25 | 1119 |
| COMP-32 | SPO-4 | A | SP39000 | 4 | 1680 | Flocculated | |
| COMP-33 | SPO-5 | A | SP39000 | 5 | 1214 | Flocculated | |
| INV-16 | SPO-6 | A | SP39000 | 136 | 83 | 50 | 126 |
| COMP-34 | PR177 | A | SP39000 | 5 | 974 | 0 | 968 |
| COMP-35 | PR177 | A | SP35000 | 7 | 728 | 0 | 861 |
| INV-17 | SPR-9 | A | SP39000 | 93 | 84 | 19 | 81 |
| INV-18 | SPR-9 | A | SP35000 | 70 | 91 | 9 | 89 |

From Table 8, it should be clear that although the starting pigments PR214, PR146 and PR176 are all 2-naphthalenecarboxamides that only the pigments PR146 and PR176 sulfonated according to the invention deliver inkjet inks of excellent dispersion quality and stability (see inks INV-13 and INV-14 compared to inks COMP-14 to COMP-20). The comparative inkjet ink COMP-17 shows that refluxing in acetonitrile with the dispersion synergist DS-2 does not deliver a good dispersion quality and stability, as neither refluxing in the presence of other solvents than an alkyl nitrile does this for the comparative inkjet inks COMP-18 and COMP-19.

Similarly, PR122 and PV19 are both quinacridones, but only the pigment SPR-8 prepared according to a preferred embodiment of the present invention delivers a good dispersion quality and stability. PO$_{34}$ and P013 are both 3H-pyrazol-3-one pigments, but again only the pigment P013 sulfonated according to the invention SPO-6 delivers an inkjet ink INV-16 of excellent dispersion quality and stability.

The inventive inkjet inks INV-17 and INV-18 show that excellent dispersion quality and stability can be obtained irrespective of which dispersant SP35000 or SP39000 is used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of preparing a pigment comprising the steps of:
    providing a mixture including:
        a pigment, or a mixed crystal of a pigment comprising at least 50 wt % of a total weight of pigment in the mixture, selected from the group of pigments consisting of C.I. Pigment Violet 23, C.I. Pigment Red 146, C.I. Pigment Red 176, C.I. Pigment Red 177, C.I. Pigment Violet 19, and C.I. Pigment Orange 13;
        an alkyl nitrile; and
        at least one acid selected from the group consisting of sulfuric acid and chlorosulfuric acid, wherein the at least one acid is present in the mixture in an amount more than 2 wt % based on the total weight of the pigment in the mixture;
    heating the mixture for more than 2 hours at a temperature of at least 70° C.; and
    filtering the mixture and washing a filtrand obtained by the step of filtering with a washing liquid to remove residual acid.

2. The method according to claim 1, wherein the washing liquid contains an alkyl nitrile selected from the group consisting of acetonitrile, propionitrile, and butyronitrile.

3. The method according to claim 2, wherein the washing liquid contains water and the filtrand is washed until the filtrate has a pH between 4 and 7.

4. The method according to claim 1, wherein the alkyl nitrile in the mixture and/or an alkyl nitrile in the washing liquid is selected from the group consisting of acetonitrile, propionitrile, and butyronitrile.

5. The method according to claim 1, further comprising the step of:
    drying the filtrand.

6. The method according to claim 1, wherein the mixture is heated for at least 8 hours at a temperature of at least 75° C.

7. The method according to claim 6, wherein the mixture is cooled to a temperature below 45° C. before the step of filtering.

8. The method according to claim 1, wherein the washing liquid consists of alkyl nitrile or water.

9. The method according to claim 1, wherein the at least one acid is sulfuric acid, and the sulfuric acid is present in the mixture in amount between 20 wt % and 40 wt % based on the total weight of the pigment.

10. A pigment obtained by the method according to claim 1.

11. A non-aqueous pigment dispersion comprising:
    a non-aqueous dispersion medium;
    a polymeric dispersant; and
    at least one pigment according to claim 10.

12. The non-aqueous pigment dispersion according to claim 11, further comprising a component that is capable of being cured by UV radiation or e-beams.

13. The non-aqueous pigment dispersion according to claim 11, wherein the non-aqueous pigment dispersion is an inkjet ink.

* * * * *